United States Patent
Patitsas et al.

(10) Patent No.: US 6,401,780 B1
(45) Date of Patent: Jun. 11, 2002

(54) TIRES HAVING IMPROVED HIGH SPEED PROPERTIES

(75) Inventors: George Philemon Patitsas, Kent; Jerry Lawrence Brenner, Copley; Paul Harry Sandstrom, Tallmadge; Eric Charles Mizner, Wadsworth, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/485,463

(22) PCT Filed: Oct. 30, 1997

(86) PCT No.: PCT/US97/19806

§ 371 (c)(1),
(2), (4) Date: Feb. 7, 2000

(87) PCT Pub. No.: WO99/22951

PCT Pub. Date: May 14, 1999

(51) Int. Cl.⁷ .................. B60C 9/22; C08K 3/04
(52) U.S. Cl. ............... 152/532; 152/537; 524/495
(58) Field of Search ..................... 152/548, 530, 152/531, 564, 528, 532, 534, 537, 536, 554, 558; 524/495, 496, 514, 515, 525, 543; 525/232, 236

(56) References Cited

U.S. PATENT DOCUMENTS

| | | | | |
|---|---|---|---|---|
| 3,802,478 A | * | 4/1974 | Boustany et al. | 152/357 |
| 3,916,968 A | | 11/1975 | Masson | 152/353 |
| 5,006,603 A | * | 4/1991 | Takaki et al. | 525/178 |
| 5,023,301 A | * | 6/1991 | Burlett et al. | 525/232 |
| 5,049,610 A | | 9/1991 | Takaki et al. | 524/514 |
| 5,361,818 A | * | 11/1994 | Tung et al. | 152/525 |
| 5,378,754 A | * | 1/1995 | Bauer et al. | 524/514 |
| 6,142,205 A | * | 11/2000 | Beck, Jr. et al. | 152/542 |

FOREIGN PATENT DOCUMENTS

| | | | |
|---|---|---|---|
| EP | 0 445 486 A | 3/1995 | C08L/21/00 |
| EP | 0 645 263 A | 3/1995 | B60C/1/00 |
| EP | 0 645 431 A | 3/1995 | C08L/67/00 |
| FR | 2 110 703 A | 6/1972 | B60C/11/00 |
| FR | 2 671 516 A | 7/1992 | B60C/09/00 |
| GB | 1 130 745 A | 10/1968 | B60C/9/18 |

* cited by examiner

Primary Examiner—Edward J. Cain
Assistant Examiner—Katarzyna W. Lee
(74) Attorney, Agent, or Firm—David E Wheeler

(57) ABSTRACT

A pneumatic tire, which has belts, gum strips and an overlay, which contain 2–15 phr of thermoplastic reinforcing polymer as an addition to a compound or as a replacement for 5–25 phr of carbon black, has good high speed properties.

7 Claims, 3 Drawing Sheets

TIRES HAVING IMPROVED HIGH SPEED PROPERTIES

BACKGROUND OF THE INVENTION

The invention relates to tires that have improved high speed properties.

Conventionally tires are loaded with high surface area carbon black to provide good tear strength and increase the modulus of the rubber. A high level of the carbon black, however, causes the tires to have a high hysteresis, which contributes to a high rolling resistance, which works against high speed properties.

In the conception of the present invention, it was proposed that if the level of carbon black was reduced, and the omitted carbon black was replaced with a filler material that reduced the hysteresis of tire components in the crown area of the tire while maintaining stiffness, that rolling resistance could be improved, with a complementary improvement in high speed properties.

It is an object of the present invention to provide a tire with improved high speed properties.

Other objects of the invention will be apparent from the following description and claims.

SUMMARY OF THE INVENTION

A pneumatic tire is provided comprising a pair of axially spaced apart annular beads, carcass plies wrapped around the beads, reinforcing belt plies disposed over the carcass plies in a crown area of the tire, gum strips disposed between edges of the belt, and an overlay disposed radially outward of the belts, tread disposed radially outward of the overlay, and sidewalls disposed between the tread and beads. The elastomer of the belts, overlay and gum strips comprises a polymer blend of 2–15 parts by weight thermoplastic reinforcing polymer per 100 parts by weight tread rubber (2–15 phr). In the illustrated embodiment, the polymer blend has a 100% modulus of 5.5 to 7.5.

The improved properties described herein are observed when the reinforcing polymer is mixed into the rubber used in the crown area reinforcement (the belts, gum strips and overlay) in a two step process where reinforcing polymer domains are predeveloped in a master batch as a first step in the process. Also, the improved tire properties described are observed only when the reinforcing domains are in all three components of the crown area reinforcement as described above.

In illustrated embodiments, the thermoplastic reinforcing polymer is polyamide or polypropylene, and the elastomer comprises polybutadiene, polyisoprene, styrene/butadiene copolymers, and mixtures thereof. The thermoplastic reinforcing polymer may be grafted to the tread rubber using a grafting agent.

DETAILED DESCRIPTION OF THE INVENTION

Figure 1:
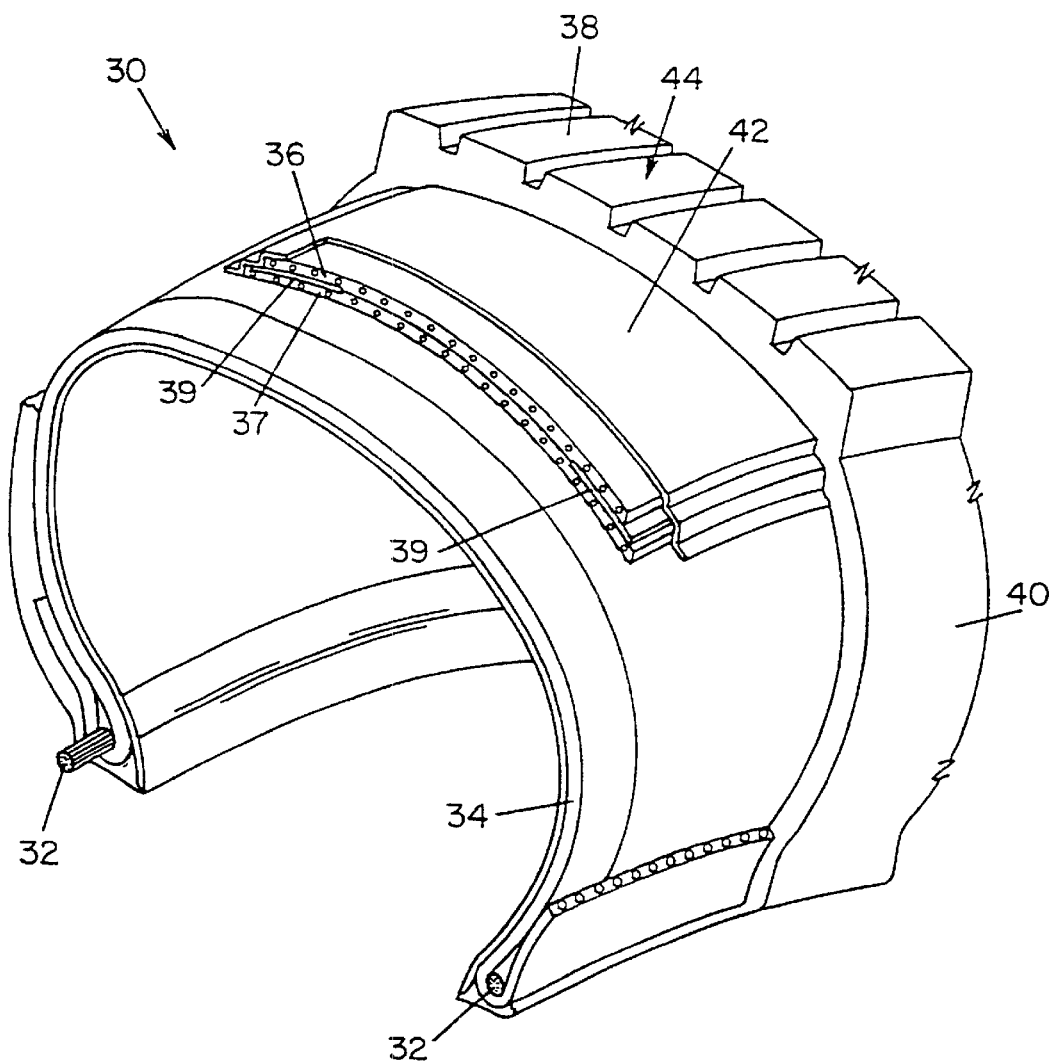
FIG. 1 illustrates a cross section of a tire delineating the tread base and tread cap.
Figure 2:
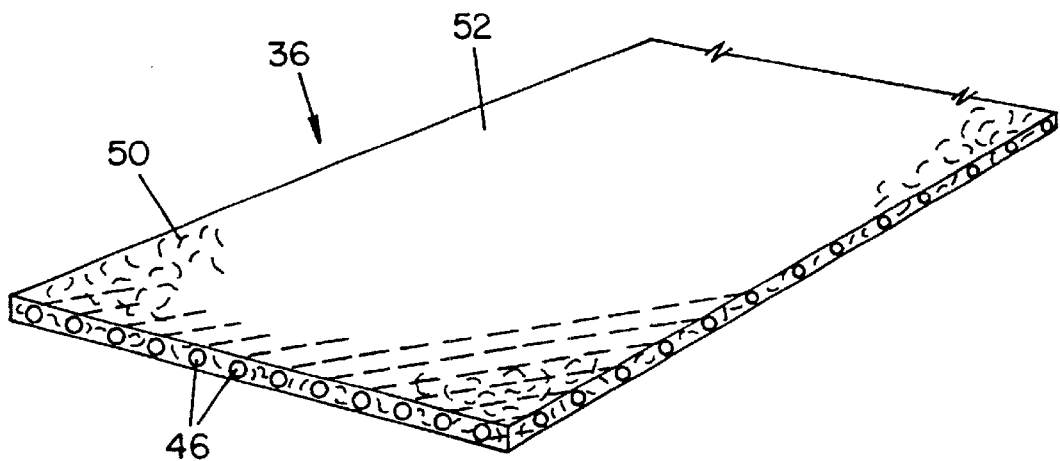
FIG. 2 illustrates a belt ply containing thermoplastic domains/fibers.
Figure 3:
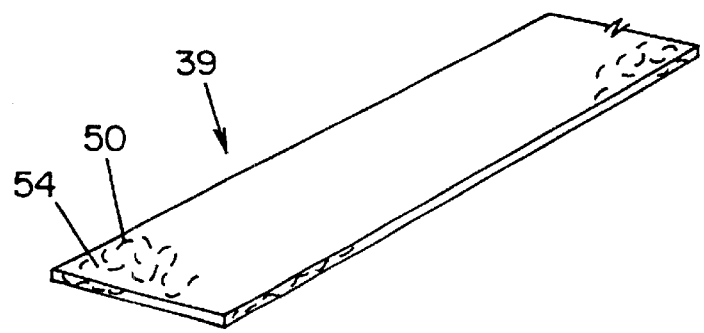
FIG. 3 illustrates a gum strip with thermoplastic domains/fibers.
Figure 4:
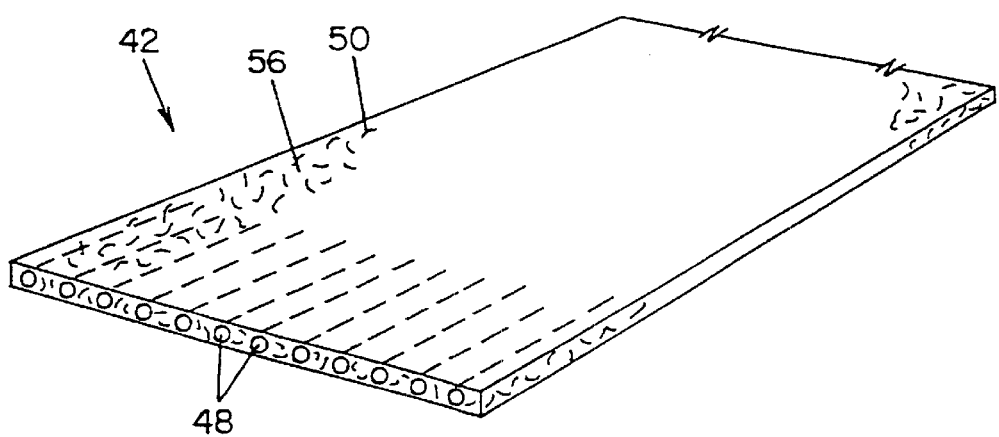
FIG. 4 illustrates an overlay ply containing thermoplastic domains/fibers.
Figure 4A:
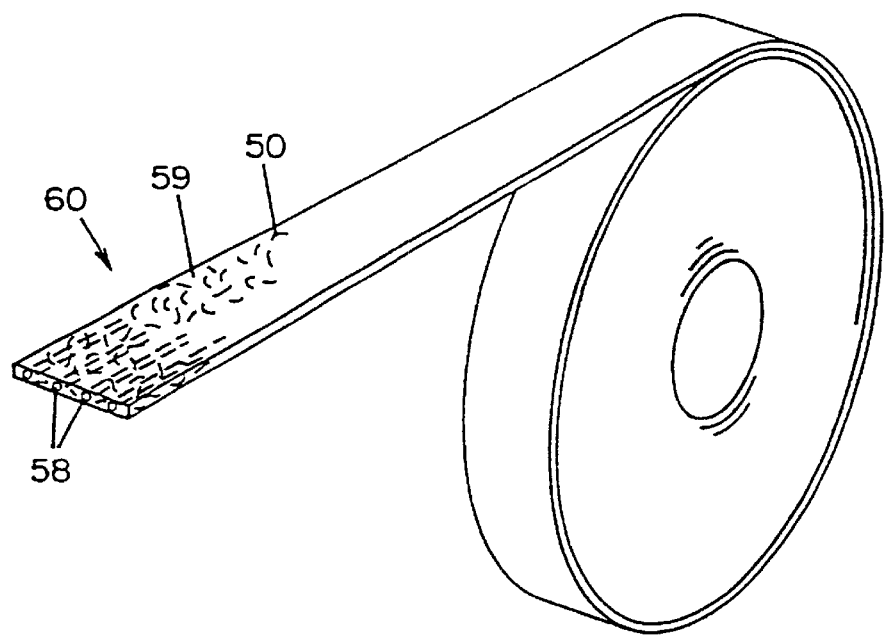
FIG. 4a illustrates a spiral overlay containing thermoplastic domains/fibers.

With reference now to FIG. 1, a tire 30 of the invention is illustrated having a tread 44, and an overlay 42 and gumstrips 39, in addition to beads 32, sidewalls 40, carcass plies 34 and belts 36.

It has been found that the improved tire properties described herein are observed only when the reinforcing polymers are included in the elastomers of the crown reinforcement of the tire, i.e. the wire coat compound (elastomer of the belt plies), the elastomer in the gum strips and the elastomer in the overlay ply.

The crown reinforcement elastomers, in addition to conventional polymers, includes 2–30 phr thermoplastic resins. Such thermoplas resins may be included as replacement for 5–25 phr carbon black in the elastomer.

Examples of thermoplastic resins that may be used in the elastomer include polyamides and polypropylene.

The filled elastomers, illustrated for use in the crown reinforcement, have a 100% modulus of 5.5 to 7.5. By contrast, the same rubber formulations, without thermoplastic resin reinforcement, and a reinforcing amount of carbon black, have a 100% modulus of about 3.5 to 4.5.

Crown reinforcement elastomers made with the thermoplastic reinforcing polymer of the invention are prepared by a two step process. The first step involves the preparation of a polymer alloy containing thermoplastic reinforcing polymer. This process is described in U.S. Pat. Nos. 4,937,290 and 4,996,262, which are incorporated herein by reference. The second stage of the process is the blending of the polymer alloy of step one with polymers, such as rubbers, and other compounding ingredients, in conventional mixers, such as Banbury® mixers, extruders, or a mill mixer. The second step blending or mixing can be accomplished using compounding techniques well known in the art.

In the process of producing the alloy at elevated temperatures, a micro dispersion of the thermoplastic reinforcing polymer in an elastomer matrix is obtained. Such high temperatures cannot be achieved during normal Banbury mixing and such a micro dispersion cannot be obtained at normal temperatures, thus requiring the two-stage process.

The elastomers blended with the thermoplastic alloy in the second step of the process are preferably rubbers having carbon-carbon unsaturation, which can be sulfur cured. Examples of such rubbers are cis-1,4-polyisoprene (natural or synthetic), cis-1,4-polybutadiene, 3,4-polyisoprene, styrene/butadiene copolymers, styrene/isoprene/butadiene terpolymers, butadiene/acrylonitrile copolymers and isoprene/acrylonitrile copolymers, and mixtures thereof. Generally, a mixture of two or more of natural rubber and synthetic rubbers, such as cis-1,4-polyisoprene, cis-1,4-polybutadiene, 3,4-polyisoprene, styrene/butadiene copolymers and styrene/isoprene/butadiene terpolymers is preferred.

Those skilled in the art will recognize that small amounts of additional curatives (other than sulfur), such as peroxides, can be used in the composition.

Polybutadiene rubbers having low to high vinyl content, in the range of 30 to 90%, preferably 40 to 70%, can also be used.

The styrene/butadiene copolymer rubber (SBR) can be a solution type or an emulsion polymerization rubber with a wide range of vinyl content.

Various additives can be used and mixed with the rubber composition, such as carbon black, silica, rubber processing oils, sulfur cure accelerators and retarders, antidegradants, zinc oxide, zinc stearate and/or zinc acid, and other pigments, as desired.

If desired, a third step may be used in the mixing process wherein the sulfur and accelerators are withheld from the second step, and added separately in a third step.

Other such variations in the mixing of the elastomer compositions used in the invention will be apparent to those skilled in the art.

Lab testing suggests that physical properties of a wire coat compound (elastomer used to make reinforcing belts in a tire) are optimized for stiffness, wire adhesion, and high temperature durability when sufficient amounts of a nylon/natsyn blend (nylon 12 mixed with synthetic 2,4 polybutadiene) are used to replace an equal amount of carbon black with nylon 12, for example 7.5 phr (7.5 parts by weight nylon 12 per hundred parts by weight rubber) in place of (i.p.o.) 7.5 phr carbon black, as in the example.

Thermoplastic reinforced elastomers may be used in any part of a tire where elastomers are used, but to enhance high speed properties, it is preferred that the alloys be used in the belt properties was observed when the alloys of the invention were tested in the belts, only or the overlay and gum strips only.

As illustrated in the examples, the 100% modulus of elastomers that are filled with nylon 12 is increased substantially over the modulus of the same elastomer that is filled with carbon black as a reinforcing agent. Meanwhile, the rebound properties of the same elastomer filled with nylon 12 are similar to the properties of the carbon black filled elastomer The invention is further illustrated with reference to the following examples.

EXAMPLE I

A nylon 12/polyisoprene alloy was produced in a Berstorf 43 mm co-rotating twin screw extruder. The twin screw extruder was operated at 55 rpm (revolution per minute) to provide an extrudate temperature of about 230° C. The starting materials were introduced using loss-in-weight feeders and were introduced into the first barrel section. The overall feed rate of materials was 30 lbs./hr., wherein nylon 12 was added at a rate of 5.98 lbs./hr, polyisoprene was added at a rate of 23.8 lbs./hr, and 0.46 lbs./hr comprised a mixture of dithiodiproprionic acid, thiodiphenyamine and an antioxidant.

The alloy thus produced was formulated into an elastomer having the following general composition used in the examples is shown in Table 1. The amounts of ingredients shown in this table, and throughout the specification, are in phr, unless otherwise indicated.

TABLE 1

| 1st Non-Productive | |
| --- | --- |
| Natural Rubber | 50.0 |
| Synthetic cis-1,4-polyisoprene rubber[1] | 50.0 |
| Carbon Black[2] | Variable |
| Fatty Acid | 2.0 |
| Processing Oil[3] | 1.0 |
| Resorcinol | 2.0 |
| Zinc Oxide | 5.0 |
| Nylon/NAT2200 | Variable |
| Productive | |
| Antidegradant[4] | .75 |
| Zinc Oxide | 3.0 |
| Accelerators, Resin[5] | 4.0 |
| Sulfur | 2.4 |
| Retarder[6] | 0.1 |

[1]NAT2200 from The Goodyear Tire & Rubber Company
[2]HAF type carbon black
[3]Naphthenic/Paraffinic oil
[4]amine type
[5]sulfenamide accelerators plus hexamethoxymethyl-melamine
[6]phthalimide type

EXAMPLE II

The rubber compositions containing the materials set out in Table 1 were prepared in a BR Banbury rubber mixer using two different stages of addition (mixing). A non-productive stage was mixed for about 4 minutes to a final temperature of about 160° C., and a final productive stage was mixed for about 2 minutes to a final temperature of about 110° C. The cure behavior and cured properties of the compounds are shown in Table 2.

The physical properties characterizing the compounds in the table are well known to those skilled in the art.

Compounds 1, 3, and 4 were selected for evaluation in a tire program. Compound 4 is used as the control.

In the table the amount of nylon/nat2200 blend used in the composition in phr is described, followed in parentheses by the overall amount of nylon used in the composition in phr, for example, 37.5(7.5).

Also, dNm represents deci Newton meters, and MPa represents megapascals.

TABLE 2

| | Sample # | | | | | | | | |
|---|---|---|---|---|---|---|---|---|---|
| | 1 | 2 | 3 | 4 | 5 | 6 | 7 | 8 | 9 |
| Carbon Black phr | 52.5 | 45 | 60 | 60 | 60 | 45 | 52.5 | 45 | 52.5 |
| Nylon/NAT2200 phr | 37.5 (7.5) | 0 | 37.5 (7.5) | 0 | 75 (15) | 75 (15) | 0 | 75 (15) | 75 (15) |
| Rheometer, 150° C. | | | | | | | | | |
| Max Torque, dNm | 61.4 | 49.8 | 65.9 | 61.7 | 72.6 | 65.2 | 54.5 | 53.6 | 68.1 |
| Min Torque, dNm | 9.5 | 7.2 | 10.5 | 10.2 | 14.2 | 11.2 | 8.4 | 7.4 | 11.9 |
| Delta Torque, dNm | 51.9 | 42.6 | 55.4 | 51.5 | 58.4 | 54.0 | 46.1 | 46.2 | 56.2 |
| T90, Minutes | 20.5 | 18.4 | 21.6 | 20.0 | 22.1 | 21.3 | 19.9 | 19.9 | 20.9 |
| Stress-Strain | | | | | | | | | |
| Tensile Strength, Mpa | 20.5 | 23.5 | 19.5 | 22.5 | 17.8 | 17.2 | 19.2 | 16.9 | 15.2 |
| Elongation At Break, % | 465 | 560 | 430 | 440 | 330 | 398 | 531 | 460 | 356 |
| 100% Modulus, Mpa | 4.8 | 2.2 | 5.2 | 3.2 | 6.6 | 6.0 | 3.0 | 4.0 | 6.0 |
| Rebound | | | | | | | | | |
| 100° C., % | 54 | 57 | 51 | 52 | 47 | 55 | 57 | 59 | 53 |
| Hardness | | | | | | | | | |
| 100° C. | 78 | 67 | 80 | 75 | 83 | 75 | 70 | 69 | 77 |

The value in parantheses represents Nylon phr in the final rubber composition.

Compounds 10, 11 and 12 were prepared in a factory Banbury mixer to be used in the tire program illustrated in Example III. Compound 11 was selected to evaluate the affects of higher hardness and modulus as compared to the control in a compound having rebound similar to the control, whereas compound 12 was selected for evaluation of a compound with higher rebound as compared to the control and hardness similar to that of the control. Compound 10 is the comparison or control compound.

TABLE 3

| Sample # | 10 | 11 | 12 |
|---|---|---|---|
| Carbon Black | 60 | 60 | 52.5 |
| Nylon/NAT2200 | 0 | 37.5 (7.5) | 37.5 (7.5) |
| Rheometer (150° C.) | | | |
| Max. Torque, dNm | 58.1 | 64.6 | 60.0 |
| Min. torque, dNm | 11.6 | 12.0 | 11.1 |
| Delta torque, dNm | 46.5 | 52.6 | 48.9 |
| T90, minutes | 18.3 | 20.3 | 19.3 |
| Stress-Strain | | | |
| Tensile Strength, Mpa | 20.0 | 19.2 | 6 |
| Elongation at break, % | 427 | 331 | 368 |
| 100% Modulus, MPa | 4.0 | 6.6 | 5.7 |
| 300% Modulus, MPa | 14.9 | 19.1 | 17.5 |
| Rebound | | | |
| 100° C., % | 56 | 56 | 60 |
| Hardness | | | |
| 100° C., % | 76 | 79 | 75 |
| Rheovibron | | | |
| E' at 60° C., Mpa | 13.0 | 62.0 | 44.0 |
| Tan Delta at 60° C. | .064 | .074 | .068 |

EXAMPLE III

The control compound (Sample #10) and the experimental compounds (Samples #11 and #12 from Table 3 were evaluated in P225/50VR16 Eagle passenger tires. The experimental compounds were evaluated in the wirecoat, gum strips and overlay. The description of the constructions evaluated are shown in Table 4. All constructions (1–5) exhibited similar handling, rolling resistance and durability. The use of Sample #11 (construction 2) in all components as shown in Table 4 gave significantly better high speed results in the laboratory step test (where the speed on a test machine is increased in increments until the tire fails). Two tires of each construction were tested.

Apparently the combination of higher hardness and similar rebound in all three tire components (construction 2) gave improved high speed performance over the control construction. Construction 3, prepared using compounds with higher rebound and similar hardness, as compared to the control, did not show improvement over the control (construction 1).

TABLE 4

| Construction | 1 | 2 | 3 | 4 | 5 |
|---|---|---|---|---|---|
| Wire Coat | Cont | Sample #11 | Sample #12 | Cont | Cont |
| Gum Strip | Cont | Sample #11 | Sample #12 | Sample #12 | Cont |
| Overlay | Cont | Sample #11 | Sample #12 | Cont | Sample #12 |
| Speed steps | – | + | — | –½ | –1 |

In the table, the dash (–) indicates the performance of the control tire in the speed step test, + indicates an improvement of one speed step over the control, and the minuses indicate performance levels less than the control.

While specific embodiments of the invention have been illustrated and described, those skilled in the art will recognize that the invention may be variously modified and practiced without departing from the spirit of the invention. The invention is limited only by the scope of the following claims.

What is claimed is:

1. A pneumatic tire comprising a pair of axially spaced annular beads, carcass plies wrapped around said beads, reinforcing belts disposed over said carcass plies in a crown area of said tire and gum strips associated with belt edges, tread disposed over said belts in said crown area, and an overlay interposed between said tread and said belts, and sidewalls disposed between said tread and said beads, wherein elastomers used in said belts, gum strips and overlay comprises 60 phr carbon black and 7.5 phr nylon, in rubber, said elastomer having a 100% modulus of 5.5 to 7.5, a delta torque of 52.6 dNm, a T90 of 20.3 minutes, a tensile strength 19.2 MPa, an elongation at break of 331%, a 100% modulus 6.6 MPa, a 300% modulus of 19.1 MPa, a rebound at 100° C. of 56, a hardness at 100° C. of 79, a rheovibron E' at 60° C. of 62 MPa, a tan delta at 60° C. of 0.074.

2. The tire of claim 1 in which said thermoplastic polymer is polyamide or polypropylene and said elastomer is selected from the group consisting of cis-1,4-polyisoprene (natural or synthetic), cis-1,4-polybutadiene, 3,4-polyisoprene, styrene/butadiene copolymers, styrene/isoprene/butadiene terpolymers, butadiene/acrylonitrile copolymers, isoprene/acrylonitrile copolymers, and mixtures thereof.

3. The tire of claim 1 in which said thermoplastic polymer is nylon and said elastomer is natural rubber and SBR.

4. The tire of claim 1 further comprising thermoplastic resin polypropylene.

5. The tire of claim 4 wherein the elastomer used in the overlay, gumstrips and belt is made by mixing 5 to 80 phr thermoplastic resin with rubber in a co-rotating twin screw extruder to form a resin/elastomer alloy, and the alloy thus produced was formulated into an elastomer to yield a final concentration of 2 to 30 phr thermoplastic resin in said elastomer.

6. The tire of claim 5 wherein the elastomer of the gumstrips, overlay and belt comprises in a non-productive composition comprising

| Natural Rubber | 50.0 phr |
|---|---|
| Synthetic cis-1,4-polyisoprene rubber | 50.0 phr |
| Carbon Black | 45–60 phr |
| Fatty Acid | 2.0 phr |
| Processing Oil | 1.0 phr |
| Resorcinol | 2.0 phr |
| Zinc Oxide | 5.0 phr |
| Nylon/NAT2200 | 37.5 to 75 phr | and a productive composition comprising

| Antidegradant | .75 phr |
|---|---|
| Zinc Oxide | 3.0 phr |
| Accelerators, Resin | 4.0 phr |
| Sulfur | 2.4 phr |
| Retarder | 0.1 phr |

7. The tire of claim 6 wherein the said alloy was produced in a twin screw extruder which was operated at 55 rpm (revolution per minute) to provide an extrudate temperature of about 230° C., and wherein the starting materials were introduced using loss-in-weight feeders in the first barrel section, wherein the overall feed rate of materials was 30 lbs./hr.and thermoplastic resin was added at a rate of 5.98 lbs./hr and elastomer was added at a rate of 23.8 lbs./hr, and a mixture of dithiodiproprionic acid, thiodiphenyamine and an antioxidant were added at a rate of 0.46 lbs./hr.

\* \* \* \* \*